US012568319B2

(12) United States Patent
Shen et al.

(10) Patent No.: US 12,568,319 B2
(45) Date of Patent: Mar. 3, 2026

(54) IMAGE DEVICE CAPABLE OF SWITCHING BETWEEN GLOBAL SHUTTER MODE AND DYNAMIC VISION SENSOR MODE

(71) Applicant: Himax Imaging Limited, Tainan City (TW)

(72) Inventors: Hsin-Hung Shen, Tainan City (TW); Dong-Long Lin, Tainan City (TW)

(73) Assignee: Himax Imaging Limited, Tainan City (TW)

( * ) Notice: Subject to any disclaimer, the term of this patent is extended or adjusted under 35 U.S.C. 154(b) by 144 days.

(21) Appl. No.: 18/587,903

(22) Filed: Feb. 26, 2024

(65) Prior Publication Data

US 2025/0274680 A1 Aug. 28, 2025

(51) Int. Cl.
*H04N 25/47* (2023.01)
*H04N 25/707* (2023.01)
*H04N 25/77* (2023.01)
*H04N 25/78* (2023.01)

(52) U.S. Cl.
CPC ........... *H04N 25/47* (2023.01); *H04N 25/707* (2023.01); *H04N 25/77* (2023.01); *H04N 25/78* (2023.01)

(58) Field of Classification Search
None
See application file for complete search history.

(56) References Cited

U.S. PATENT DOCUMENTS

| | | | | |
|---|---|---|---|---|
| 6,566,697 | B1 * | 5/2003 | Fox | H04N 25/65 348/E3.018 |
| 10,812,740 | B2 | 10/2020 | Xu | |
| 10,992,923 | B2 | 4/2021 | Hicks | |
| 2013/0037699 | A1 * | 2/2013 | Ihori | H04N 25/77 250/208.1 |
| 2014/0204250 | A1 * | 7/2014 | Kim | H04N 25/42 348/294 |
| 2016/0088251 | A1 * | 3/2016 | Luo | H04N 25/771 250/208.1 |
| 2021/0235036 | A1 * | 7/2021 | Kitano | H10F 39/18 |

* cited by examiner

*Primary Examiner* — Twyler L Haskins
*Assistant Examiner* — Wesley J Chiu
(74) *Attorney, Agent, or Firm* — Winston Hsu

(57) ABSTRACT

An image device has a pixel array and a controller. The pixel array includes a plurality of sensor pixels. The controller is coupled to the pixel array to switch the image device between a first mode and a second mode. When the image device is in the first mode, the controller manipulates the sensor pixels according to a first timing scheme, configuring the image device to function as a global shutter image sensor for capturing images of a scene. When the image device is in the second mode, the controller manipulates the sensor pixels according to a second timing scheme, configuring the image device to function as a dynamic vision sensor (DVS) for detecting changes in the scene.

12 Claims, 4 Drawing Sheets

IMAGE DEVICE CAPABLE OF SWITCHING BETWEEN GLOBAL SHUTTER MODE AND DYNAMIC VISION SENSOR MODE

BACKGROUND OF THE INVENTION

1. Field of the Invention

The present invention is related to an image device, and more particularly to an image device switching between a global shutter mode and a dynamic vision sensor (DVS) mode.

2. Description of the Prior Art

A global shutter image device is a camera or other image sensor that exposes all of its pixels simultaneously. This allows it to capture images of moving objects without any distortion or blur. Global shutter devices are often used in applications where it is important to accurately capture motion, such as in industrial automation, surveillance, and medical imaging.

A dynamic vision sensor (DVS) is a type of camera that captures images by detecting changes in light intensity over time. This allows it to capture images of moving objects without any distortion or blur, even at high frame rates. DVS devices are often used in applications where it is important to accurately capture motion, such as in robotics, autonomous vehicles, and machine vision.

However, in the prior art, there was no single image device that could be used as both a global shutter image device and a dynamic vision sensor (DVS).

SUMMARY OF THE INVENTION

An embodiment of the present invention provides an image device having a pixel array and a controller. The pixel array comprises a plurality of sensor pixels. The controller is coupled to the pixel array and configured to switch the image device between a first mode and a second mode. When the image device is in the first mode, the controller manipulates the sensor pixels according to a first timing scheme, configuring the image device to function as a global shutter image sensor for capturing images of a scene. When the image device is in the second mode, the controller manipulates the sensor pixels according to a second timing scheme, configuring the image device to function as a dynamic vision sensor (DVS) for detecting changes in the scene.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
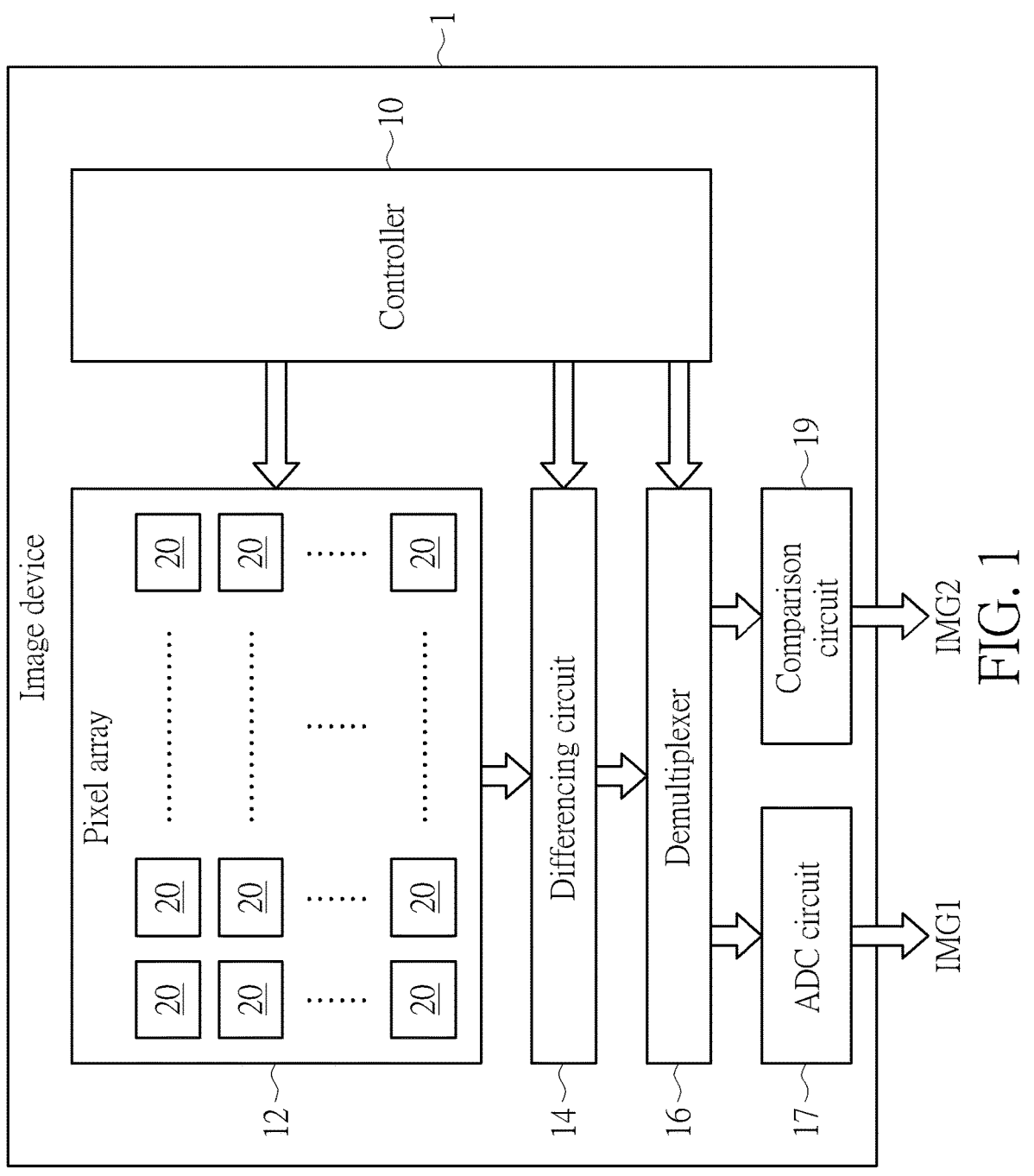
FIG. 1 is a functional block diagram of an image device according to an embodiment of the present invention.

Please refer to FIG. 1. FIG. 1 is a functional block diagram of an image device 1 according to an embodiment of the present invention. The image device 1 comprises a controller 10 and a pixel array 12. The pixel array 12 comprises a plurality of sensor pixels 20. The sensor pixels 20 are arranged in M rows and N columns. M and N are integers greater than 1. The controller 10 is coupled to the pixel array 12 and is configured to switch the image device 1 between a first mode and a second mode. When the image device 1 is in the first mode, the controller 10 manipulates the sensor pixels 20 according to a first timing scheme, configuring the image device 1 to function as a global shutter image sensor for capturing images of a scene. When the image device 1 is in the second mode, the controller 10 manipulates the sensor pixels 20 according to a second timing scheme, configuring the image device 1 to function as a dynamic vision sensor (DVS) for detecting changes in the scene. In addition, the image device 1 may further comprise a lens or lenses to focus light from the scene onto the sensor pixels 20 of the pixel array 12. The sensor pixels 20 convert the received light into an image IMG1 of the scene in the first mode or a dynamic vision image IMG2 in the second mode.

Figure 2:
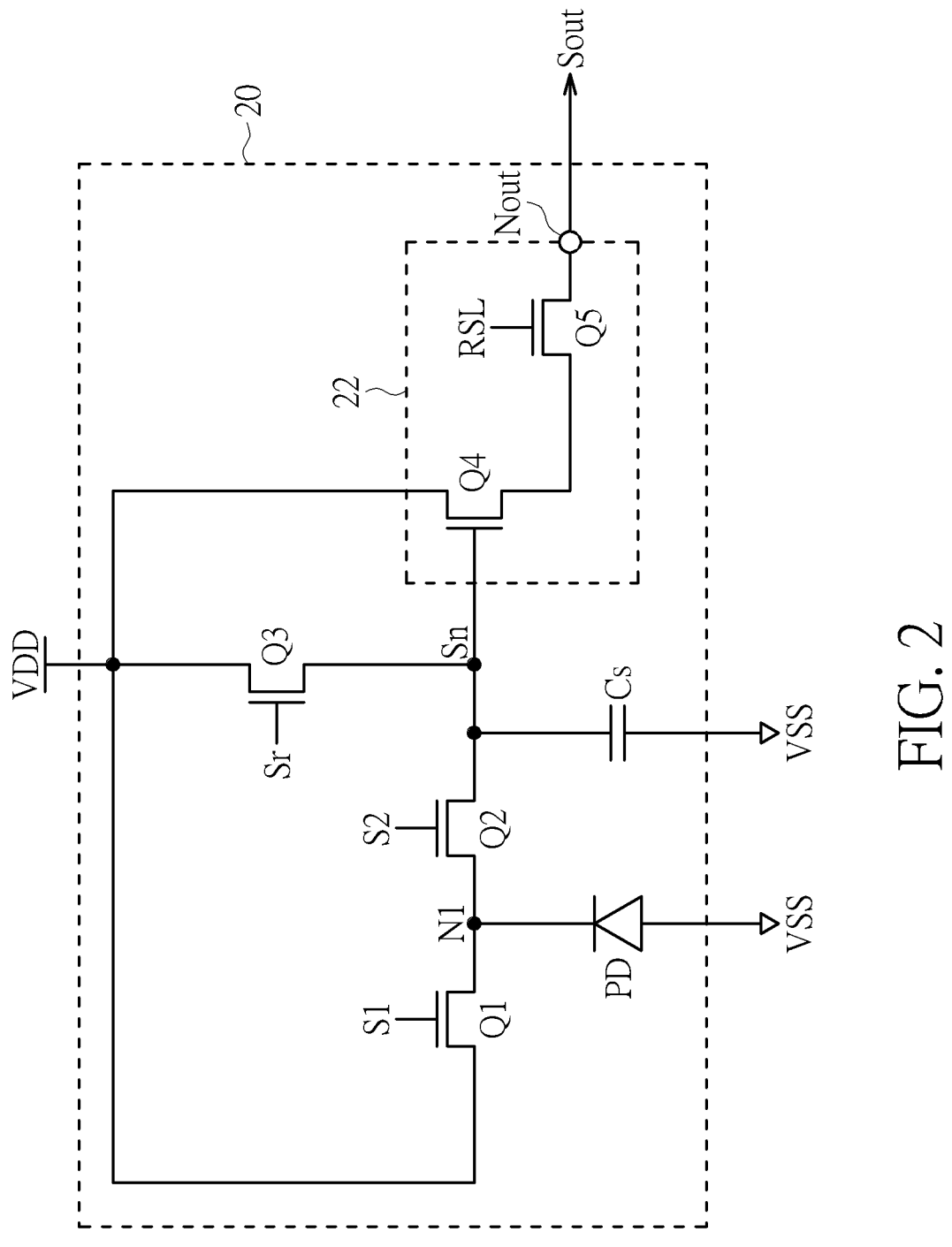
FIG. 2 is a circuit diagram of a sensor pixel of the image device shown in FIG. 1.

Please refer to FIG. 2. FIG. 2 is a circuit diagram of one of the sensor pixels 20 of the image device 1 shown in FIG. 1. Each of the sensor pixels 20 comprises a photodiode PD, a first switch Q1, a second switch Q2, a reset switch Q3, and a readout circuit 22. The photodiode PD is configured to detect light. The first switch Q1 is coupled between a first power supply terminal VDD and a first end N1 of the photodiode PD, and is configured to reset a voltage level of the first end N1 of the photodiode PD. The first power supply terminal VDD provides a positive reference voltage. The second switch Q2 is coupled between the first end N1 of the photodiode PD and a floating diffusion node Sn, and is configured to transfer the voltage level of the first end N1 of the photodiode PD to the floating diffusion node Sn. A parasitic capacitance Cs exits between the floating diffusion node Sn and a second power supply terminal VSS. The second power supply terminal VSS may provide a ground voltage. The reset switch Q3 is coupled between the first power supply terminal VDD and the floating diffusion node Sn, and is configured to reset a voltage level of the floating diffusion node Sn. The readout circuit 22 is coupled to the second switch Q2 and the reset switch Q3, and is configured to output a readout signal Sout based on the voltage level of the floating diffusion node Sn. The readout circuit 22 comprises a transistor Q4 and a readout switch Q5. A first end of the transistor Q4 is coupled to the first power supply terminal VDD, a second end of the transistor Q4 is coupled to the readout switch Q5, and a control end of the transistor Q4 is coupled to the floating diffusion node Sn. The readout switch Q5 is configured to control electrical connection between the second end of the transistor Q4 and an output end Nout of the readout circuit 22. The readout signal Sout is outputted via the output end Nout. In addition, the second end of the photodiode PD is coupled to the second power supply terminal VSS.

In the embodiment, the first switch Q1, the second switch Q2, the reset switch Q3, the transistor Q4, and the readout switch Q5 are N-type transistors, and the sensor pixel 20 is a 5T pixel (i.e., a pixel having five transistors). The gates of the first switch Q1, the second switch Q2, the reset switch Q3, and the readout switch Q5 respectively receive a first control signal S1, a second control signal S2, a reset signal Sr, and a readout control signal RSL. The gate of the transistor Q4 is coupled to the floating diffusion node Sn. When the voltage level of the floating diffusion node Sn is high, the transistor Q4 is turned on. When the voltage level of the floating diffusion node Sn is low, the transistor Q4 is turned off.

Figure 3:
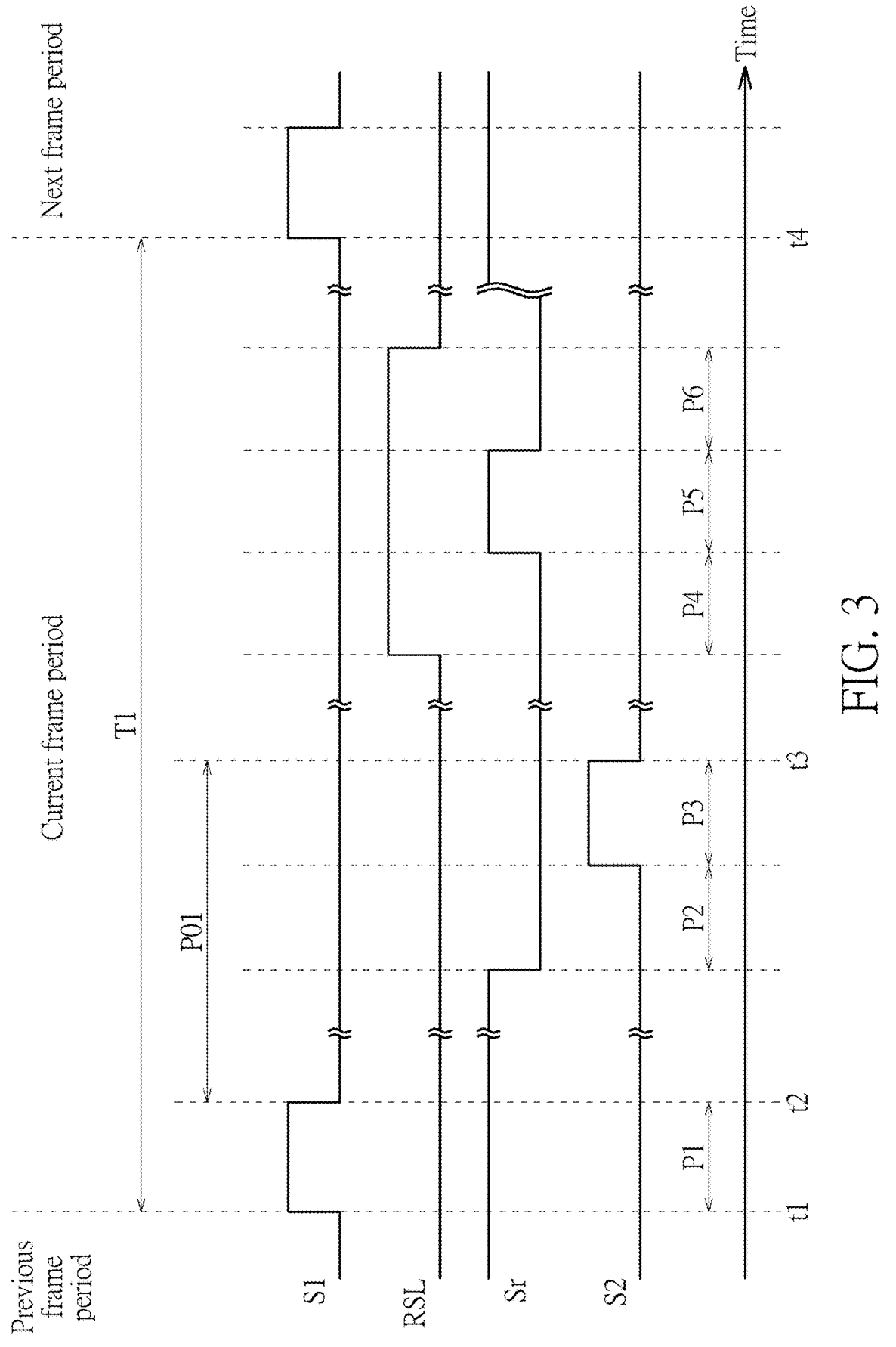
FIG. 3 is a diagram illustrating a first timing scheme of the image device shown in FIG. 1.

Please refer to FIGS. 1 to 3. FIG. 3 is a diagram illustrating a first timing scheme of the image device 1 shown in FIG. 1. When the image device 1 is in the first mode, the controller 10 manipulates the sensor pixels 20 according to the first timing scheme, configuring the image device 1 to function as a global shutter image sensor for capturing images of a scene. The image device 1 generates an image IMG1 of the scene every frame period T1. As shown in FIG. 3, the frame period T1 is equal to the duration between two adjacent rising edges of the first control signal S1, which occur at time points t1 and t4.

During a reset period P1, the first control signal S1 and the reset signal Sr are high, the readout control signal RSL and the second control signal S2 are low. This causes the first switch Q1 and the reset switch Q3 to turn on, and the second switch Q2 and the readout switch Q5 to turn off. Accordingly, the voltage level of the first end N1 of the photodiode PD is reset to be equal to the first reference voltage provided by the first power supply terminal VDD. Because the image device 1 functions as a global shutter image sensor when the image device 1 is in the first mode, the first switches Q1 and the reset switches Q3 of all of the sensor pixels 20 of the pixel array 12 are turned on during the reset period P1. Accordingly, the voltage levels of the first ends N1 of the photodiodes PD of all of the sensor pixels 20 and the voltage levels of floating diffusion nodes Sn of all of the sensor pixels 20 are reset to be equal to the first reference voltage provided by the first power supply terminal VDD.

At time point t2, the first control signal S1 is pulled from high to low, turning off the first switch Q1, stopping resetting the voltage level of the first end N1, and enabling the photodiode PD to start to accumulate charges at the first end N1 of the photodiode PD.

During a sensing period P2 after the reset period P1, the first control signal S1, the readout control signal RSL, the reset signal Sr, and the second control signal S2 are low. This causes the first switch Q1, the second switch Q2, the reset switch Q3, and the readout switch Q5 to turn off so as to accumulate charges at the first end N1 of the photodiode PD. Because the image device 1 functions as a global shutter image sensor when the image device 1 is in the first mode, the first switches Q1, the second switches Q2, the reset switches Q3, and the readout switches Q5 of all of the sensor pixels 20 of the pixel array 12 are turned off during the sensing period P2. Accordingly, charges are accumulated at the first ends N1 of the photodiodes PD of all of the sensor pixels 20 of the pixel array 12, causing the voltage levels of the first ends N1 of the photodiodes PD of all of the sensor pixels 20 to be changed by the accumulated charges.

During a transferring period P3 after the sensing period P2, the first control signal S1, the readout control signal RSL, and the reset signal Sr are low, and the second control signal S2 is high. This causes the first switch Q1, the reset switch Q3, and the readout switch Q5 to turn off, and the second switch Q2 to turn on, so as to transfer the voltage level of the first end N1 of the photodiode PD to the floating diffusion node Sn. Because the image device 1 functions as a global shutter image sensor when the image device 1 is in the first mode, the first switches Q1, the reset switches Q3, and the readout switches Q5 of all of the sensor pixels 20 of the pixel array 12 are turned off, and the second switches Q2 of all of the sensor pixels 20 of the pixel array 12 are turned on during the transferring period P3. Accordingly, the voltage levels of the first ends N1 of the photodiodes PD of all of the sensor pixels 20 are simultaneously transferred to corresponding floating diffusion nodes Sn of all of the sensor pixels 20 during the transferring period P3.

At time point t3, the second control signal S2 is pulled from high to low, turning off the second switch Q2, and locking the voltage level of the floating diffusion node Sn to a current voltage level of the first end N1. Because the photodiode PD starts to accumulate charges at the first end N1 of the photodiode PD at time point t2, and the voltage level of the floating diffusion node Sn is locked at time point t3, the locked voltage level of the floating diffusion node Sn is determined by the total charges accumulated at the first end N1 of the photodiode PD between time points t2 and t3. When the image device 1 is in the first mode, the period between t2 and t3, as labeled P01, is the exposure time and directly affects the final voltage level at the floating diffusion node Sn.

During a readout period P4 after the transferring period P3, the first control signal S1, the reset signal Sr, and the second control signal S2 are low, and the readout control signal RSL is high. This causes the first switch Q1, the reset switch Q3, and second switch Q2 to turn off, and the readout switch Q5 to turn on, so as to enable the readout circuit 22 to output the readout signal Sout based on the voltage level of the floating diffusion node Sn. Even though the image device 1 functions as a global shutter image sensor when the image device 1 is in the first mode, the sensor pixels 20 of the image device 1 can be read out non-simultaneously, either row by row or column by column, instead of being read out all at once. For example, during the readout period P4, the sensor pixels 20 of the image device 1 may be read line by line in a time-division manner. During the readout period P4, the first switches Q1, the reset switches Q3, and second switches Q2 of the sensor pixels 20 arranged in the same line of the pixel array 12 are turned off, and the readout switches Q5 arranged in the same line of the pixel array 12 are turned on, to enable the readout circuits 22 of the sensor pixels 20 arranged in the same line to output readout signals Sout based on the voltage levels of the floating diffusion nodes Sn of the sensor pixels 20 arranged in the same line of the pixel array 12. The same line of the pixel array 12 may be one of the M rows or one of the N columns of the sensor pixels 20.

During a reset period P5 after the readout period P4, the first control signal S1 and the second control signal S2 are low, and the readout control signal RSL and the reset signal Sr are high. This causes the first switch Q1 and second switch Q2 to turn off, and the reset switch Q3 and the readout switch Q5 to turn on, so as to reset the voltage level of the floating diffusion node Sn to a corresponding reference level. Because the reset switch Q3 is turned on, the corresponding reference level is approximately equal to the first reference voltage provided by the first power supply terminal VDD. During the reset period P5, the voltage levels of the floating diffusion nodes Sn of the sensor pixels 20 may be reset line by line in a time-division manner. In detail, during the reset period P5, the first switches Q1 and second switches Q2 of the sensor pixels 20 arranged in the same line of the pixel array 12 are turned off, and the reset switches Q3 and the readout switches Q5 arranged in the same line of the pixel array 12 are turned on, to reset the voltage levels of the floating diffusion nodes Sn of the sensor pixels 20 arranged in the same line to corresponding reference levels, which may vary due to manufacturing variations in the sensor pixels 20.

During a readout period P6 after the reset period P5, the first control signal S1, the reset signal Sr, and the second control signal S2 are low, and the readout control signal RSL is high. This causes the first switch Q1, the reset switch Q3, and second switch Q2 to turn off, and the readout switch Q5 to turn on, so as to enable the readout circuit 22 to output the readout signal Sout based on the voltage level of the floating diffusion node Sn. During the readout period P6, the sensor pixels 20 of the image device 1 may be read line by line in a time-division manner. In detail, during the readout period P6, the first switches Q1, the reset switches Q3, and second switches Q2 of the sensor pixels 20 arranged in the same line of the pixel array 12 are turned off, and the readout switches Q5 arranged in the same line of the pixel array 12 are turned on, to enable the readout circuits 22 of the sensor pixels 20 arranged in the same line to output readout signals Sout based on the voltage levels of the floating diffusion nodes Sn of the sensor pixels 20 arranged in the same line of the pixel array 12.

The controller 10 manipulates the sensor pixels 20 to perform correlated double sampling (CDS) operations based on the first timing scheme as illustrated in FIG. 3. Specifically, CDS operations involve comparing the readout signal Sout of each sensor pixel 20 during the readout period P4 with the same signal during the readout period P6. CDS is a method to measure electrical values such as voltages or currents that allows removing an undesired offset. It is often used when measuring sensor outputs. The output of the sensor is measured twice: once in a known condition and once in an unknown condition. The value measured from the known condition is then subtracted from the unknown condition to generate a value with a known relation to the physical quantity being measured. the CDS operations use a noise reduction technique in which a reference voltage of the sensor pixel 20 (i.e., the voltage level of the readout signal Sout within the readout period P6) is subtracted from the signal voltage of the sensor pixel 20 (i.e., the voltage level of the readout signal Sout within the readout period P4), to cancel thermal noise (i.e., Johnson-Nyquist noise or kTC noise). Assuming that the voltage level of the readout signal Sout of a sensor pixel 20, located in the $m^{th}$ row and $n^{th}$ column of the pixel array 12, read within the readout period P4 is V1 (m, n), and the voltage level of the readout signal Sout of the same sensor pixel 20 read within the readout period P6 is V2 (m, n), a difference D1 (m, n) between V1 (m, n) and V2 (m, n) can be represented by the following equation (1):

$$D1(m, n) = |V1(m, n) - V2(m, n)| \qquad (1)$$

Where 1≤m≤M, 1≤n≤N, M is the total number of rows of the sensor pixels 20 in the pixel array 12; and N is the total number of columns of the sensor pixels 20 in the pixel array 12.

The CDS operations are performed according to the difference D1 (m, n) of each sensor pixel 20, and the image device 1 in the first mode generates one image IMG1 of the scene based on the difference D1 (m, n) of each sensor pixel 20 in each frame period T1.

Figure 4:
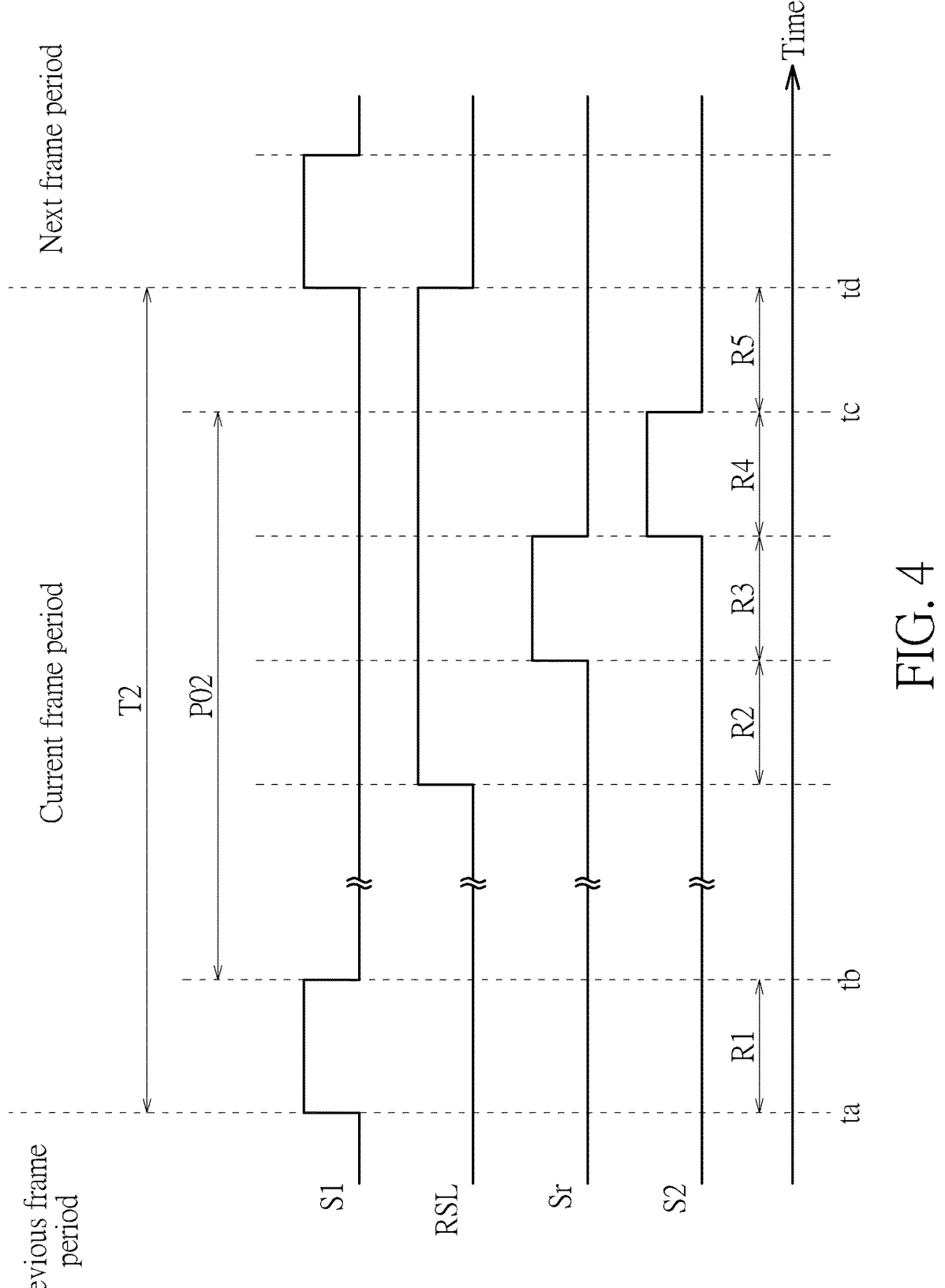
FIG. 4 is a diagram illustrating a second timing scheme of the image device shown in FIG. 1.

Please refer to FIGS. 1, 2, and 4. FIG. 4 is a diagram illustrating a second timing scheme of the image device 1 shown in FIG. 1. When the image device 1 is in the second mode, the controller 10 manipulates the sensor pixels 20 according to the second timing scheme, configuring the image device 1 to function as a dynamic vision sensor (DVS) for detecting changes in the scene. The image device 1 in the second mode generates a dynamic vision image IMG2 every frame period T2. As shown in FIG. 4, the frame period T2 is equal to the duration between two adjacent rising edges of the first control signal S1, which occur at time points ta and td.

During a reset period R1, the first control signal S1 is high, the readout control signal RSL, the reset signal Sr, and the second control signal S2 are low. This causes the first switch Q1 to turn on, and the second switch Q2, the reset switch Q3, and the readout switch Q5 to turn off. Accordingly, the voltage level of the first end N1 of the photodiode PD is reset to be equal to the first reference voltage provided by the first power supply terminal VDD. During the reset period R1, the sensor pixels 20 of the image device 1 may be reset line by line in a time-division manner. In detail, during the reset period R1, the first switches Q1 of the sensor pixels 20 arranged in the same line of the pixel array 12 are turned on, and the second switches Q2, the reset switches Q3, and the readout switches Q5 of the sensor pixels 20 arranged in the same line of the pixel array 12 are turned off. Accordingly, the voltage levels of the first ends N1 of the photodiodes PD of the sensor pixels 20 arranged in the same line of the pixel array 12 are reset within the reset period R1.

At time point tb, the first control signal S1 is pulled from high to low, turning off the first switch Q1, stopping resetting the voltage level of the first end N1, and enabling the photodiode PD to start to accumulate charges at the first end N1 of the photodiode PD.

During a sensing period R2 after the reset period R1, the first control signal S1, the reset signal Sr, and the second control signal S2 are low, and the readout control signal RSL is high. This causes the first switch Q1, the reset switch Q3, and second switch Q2 to turn off, and the readout switch Q5 to turn on, so as to accumulate charges at the first end N1 of the photodiode PD and enable the readout circuit 22 to output the readout signal Sout based on the voltage level of the floating diffusion node Sn. During the sensing period R2, the sensor pixels 20 of the image device 1 may be read line by line in a time-division manner. In detail, during the sensing period R2, the first switches Q1, the reset switches Q3, and second switches Q2 of the sensor pixels 20 arranged in the same line of the pixel array 12 are turned off, and the readout switches Q5 arranged in the same line of the pixel array 12 are turned on, to accumulate charges at the first ends N1 of the photodiodes PD of the sensor pixels 20 arranged in the same line of the pixel array 12 and enable the readout circuits 22 of the sensor pixels 20 arranged in the same line to output readout signals Sout based on the voltage levels of the floating diffusion nodes Sn of the sensor pixels 20 arranged in the same line of the pixel array 12.

During a reset period R3 after the sensing period R2, the first control signal S1 and the second control signal S2 are low, and the readout control signal RSL and the reset signal Sr are high. This causes the first switch Q1 and second switch Q2 to turn off, and the reset switch Q3 and the readout switch Q5 to turn on, so as to reset the voltage level of the floating diffusion node Sn to a corresponding reference level, which is approximately equal to the first reference voltage provided by the first power supply terminal VDD. During the reset period R3, the voltage levels of the floating diffusion nodes Sn of the sensor pixels 20 may be reset line by line in a time-division manner. In detail, during the reset period R3, the first switches Q1 and second switches Q2 of the sensor pixels 20 arranged in the same line of the pixel array 12 are turned off, and the reset switches Q3 and the readout switches Q5 arranged in the same line of the pixel array 12 are turned on, to reset the voltage levels of the floating diffusion nodes Sn of the sensor pixels 20 arranged in the same line to corresponding reference levels, which may vary due to manufacturing variations in the sensor pixels 20.

During a transferring period R4 after the reset period R3, the first control signal S1 and the reset signal Sr are low, and the readout control signal RSL and the second control signal S2 are high. This causes the first switch Q1 and the reset switch Q3 to turn off, and the second switch Q2 and the readout switch Q5 to turn on, so as to transfer the voltage level of the first end N1 of the photodiode PD to the floating diffusion node Sn. During the transferring period R4, the voltage levels of the first ends N1 of the photodiodes PD of the sensor pixels 20 may be transferred line by line in a time-division manner. In detail, during the transferring period R4, the first switches Q1 and the reset switches Q3 of the sensor pixels 20 arranged in the same pixel line are turned off, and the second switches Q2 and the readout switches Q5 of the sensor pixels 20 arranged in the same line are turned on to transfer the voltage levels of the first ends N1 of the photodiodes PD of the sensor pixels 20 arranged in the same line to the floating diffusion nodes Sn of the sensor pixels 20 arranged in the same line.

At time point tc, the second control signal S2 is pulled from high to low, turning off the second switch Q2, and locking the voltage level of the floating diffusion node Sn to a current voltage level of the first end N1. Because the photodiode PD starts to accumulate charges at the first end N1 of the photodiode PD at time point tb, and the voltage level of the floating diffusion node Sn is locked at time point tc, the locked voltage level of the floating diffusion node Sn is determined by the total charges accumulated at the first end N1 of the photodiode PD between time points tb and tc. When the image device 1 is in the second mode, the period between tb and tc, as labeled P02, is the exposure time and directly affects the final voltage level at the floating diffusion node Sn.

During a readout period R5 after the transferring period R4, the first control signal S1, the reset signal Sr, and the second control signal S2 are low, and the readout control signal RSL is high. This causes the first switch Q1, the reset switch Q3, and second switch Q2 to turn off, and the readout switch Q5 to turn on, so as to enable the readout circuit 22 to output the readout signal Sout based on the voltage level of the floating diffusion node Sn. During the readout period R5, the sensor pixels 20 of the image device 1 may be read line by line in a time-division manner. In detail, during the readout period R5, the first switches Q1, the reset switches Q3, and second switches Q2 of the sensor pixels 20 arranged in the same line of the pixel array 12 are turned off, and the readout switches Q5 arranged in the same line of the pixel array 12 are turned on, to enable the readout circuits 22 of the sensor pixels 20 arranged in the same line to output readout signals Sout based on the voltage levels of the floating diffusion nodes Sn of the sensor pixels 20 arranged in the same line of the pixel array 12.

Based on the second timing scheme as illustrated in FIG. 4, the controller 10 manipulates the sensor pixels 20 to readout pixel signals in different times (e.g., the sensing period R2 and the readout period R5). In addition, because the voltage level of the floating diffusion node Sn is reset only once per frame period T2 (i.e., the reset signal Sr has only one pulse in each frame period T2), and the reset period R3 is after the sensing period R2, the voltage level of the floating diffusion node Sn transferred within the transferring period R4 of the current frame period would be locked until the reset period R3 of the next frame period. Therefore, the readout signal Sout within the sensing period R2 of the current frame period is generated according the voltage level of the floating diffusion node Sn locked within the previous frame period. In addition, the readout signal Sout within the readout period R5 of the current frame period is generated according the voltage level of the floating diffusion node Sn transferred from the first end N1 of the photodiode PD within the transferring period R4 of the current frame period. Assuming that the voltage level of the readout signal Sout of a sensor pixel 20, located in the $m^{th}$ row and $n^{th}$ column of the pixel array 12, read within the sensing period R2 is Va (m, n), and the voltage level of the readout signal Sout of the same sensor pixel 20 read within the readout period R5 is Vb (m, n), a difference D2 (m, n) between Va (m, n) and Vb (m, n) can be represented by the following equation (2):

$$D2(m, n) = |Va(m, n) - Vb(m, n)| \qquad (2)$$

When the image device 1 is in the second mode, the controller 10 manipulates the sensor pixels 20 according to the second timing scheme as illustrated in FIG. 4, configuring the image device 1 to function as a dynamic vision sensor (DVS) for detecting changes in the scene. The image device 1 in the second mode generates a dynamic vision image IMG2 every frame period T2 according to the difference D2 (m, n) of each sensor pixel 20 of the pixel array 12.

In an embodiment of the present invention, the controller 10 switches the image device 1 from the second mode to the first mode according to the difference D2 (m, n) of each sensor pixel 20 of the pixel array 12 and a first threshold. Assuming that the first threshold is Dth, and a number of sensor pixels 20, within every frame period T2, having the difference D2 (m, n) greater than the first threshold Dth is Na, the controller 10 will switch the image device 1 from the second mode to the first mode if the number Na exceeds or equals a second threshold N2, which is a positive integer less than (M×N). If the number Na is less than the second threshold N2, the image device 1 remains in the second mode.

After controller 10 switches the image device 1 from the second mode to the first mode, the device may remain in the first mode for a predefined period. The predefined period can be, for example, 30 seconds, 1 minute, 3 minutes, or longer. While in the first mode, the image device 1 can generate a series of images (IMG1) of the scene at a specified frame rate (e.g., 25 Hz, 30 Hz, 50 Hz, and 60 Hz). In essence, the image device 1 captures a video stream in the first mode for the predefined period. Once this predefined period elapses, the controller 10 switches the image device 1 back to the second mode to detect changes in the scene again.

The image device 1 may further comprise a differencing circuit 14 coupled to the pixel array 12 and the controller 10. When the image device 1 is in the first mode, the differencing circuit 14 calculates the foresaid difference D1 (m, n) of each sensor pixel 20 of the pixel array 12. When the image device 1 is in the second mode, the differencing circuit 14 calculates the foresaid difference D2 (m, n) of each sensor pixel 20 of the pixel array 12.

The image device 1 may further comprise a demultiplexer 16, an analog-to-digital converting (ADC) circuit 17, and a comparison circuit 19. The demultiplexer 16 comprises an input port coupled to the output port of the differencing circuit 14 for receiving the difference D1 (m, n) or D2 (m, n). The demultiplexer 16 further comprises two output ports, one of the output ports is coupled to an input port of the ADC circuit 17, and the other output port is coupled to an input port of the comparison circuit 19. When the image device 1 is in the first mode, the controller 10 controls the demultiplexer 16 to output the difference D1 (m, n) of each sensor pixel 20 of the pixel array 12 to the ADC circuit 17, and the ADC circuit 17 generates the image IMG1 of the scene according to the difference D1 (m, n) of each sensor pixel 20. When the image device 1 is in the second mode, the controller 10 controls the demultiplexer 16 to output the D2 (m, n) of each sensor pixel 20 to the comparison circuit 19, and the comparison circuit 19 generates the dynamic vision image IMG2 according to the difference D2 (m, n) of each sensor pixel 20.

According to the embodiments of the present invention, the image device 1 uses the same sensor pixels 20 to serve as a global shutter image sensor in the first mode and a dynamic vision sensor (DVS) in the second mode. If the image device 1 in the second mode detects huge changes of the scene, the controller 10 may switch the image device 1 from the second mode to the first mode to generate a video stream by capturing the images of the scene. By using the same sensor pixels 20 in both modes, the hardware resources of the image device 1 are maximized, avoiding the need for separate sensor pixels for each mode. In addition, the ability to switch from the second mode to the first mode to generate a video stream when large changes in the scene are detected increases the flexibility and adaptability of the system, allowing the image device 1 to better handle different scenes and requirements. The image device 1 can remain in the second mode when there are not significant changes in the scene, reducing unnecessary computations and energy consumption, thereby increasing the efficiency of the system. Furthermore, the controller 10 can quickly switch modes to generate a video stream when large changes in the scene are detected, which helps to improve the real-time performance of the system, enabling the image device 1 to capture and process important scene changes in a timely manner.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image device, comprising:
   a pixel array, comprising a plurality of sensor pixels;
   a controller coupled to the pixel array, and configured to switch the image device between a first mode and a second mode;
   a differencing circuit coupled to the pixel array and the controller, and configured to calculate differences between first readout signals and second readout signals;
   an analog-to-digital converting (ADC) circuit;
   a comparison circuit; and
   a demultiplexer having an input port coupled to an output port of the differencing circuit, a first output port coupled to an input port of the ADC circuit, and a second output port coupled to an input port of the comparison circuit;
   wherein when the image device is in the first mode, the controller manipulates the sensor pixels according to a first timing scheme, configuring the image device to function as a global shutter image sensor for capturing images of a scene;
   wherein when the image device is in the second mode, the controller manipulates the sensor pixels according to a second timing scheme, configuring the image device to function as a dynamic vision sensor (DVS) for detecting changes in the scene;
   wherein the image device generates an image of the scene in the first mode or a dynamic vision image in the second mode according to the differences;
   wherein when the image device is in the first mode, the controller controls the demultiplexer to output the differences to the ADC circuit for generating the image of the scene; and
   wherein when the image device is in the second mode, the controller controls the demultiplexer to output the differences to the comparison circuit for generating the dynamic vision image.

2. The image device of claim 1, wherein the controller manipulates the sensor pixels to perform correlated double sampling (CDS) operations based on the first timing scheme.

3. The image device of claim 1, wherein the controller manipulates the sensor pixels to readout pixel signals in different times based on the second timing scheme.

4. The image device of claim 1, wherein each sensor pixel comprises:
   a photodiode configured to detect light;
   a first switch coupled between a first power supply terminal and a first end of the photodiode, and configured to reset a voltage level of the first end of the photodiode;
   a second switch coupled between the first end of the photodiode and a floating diffusion node, and configured to transfer the voltage level of the first end of the photodiode to the floating diffusion node; and
   a reset switch coupled between the first power supply terminal and the floating diffusion node, and configured to reset a voltage level of the floating diffusion node.

5. The image device of claim 4, wherein the first timing scheme comprises:
   during a first reset period, turning on first switches of all of the sensor pixels to reset voltage levels of first ends of photodiodes of all of the sensor pixels;
   during a first sensing period after the first reset period, turning off the first switches of all of the sensor pixels and turning off second switches of all of the sensor pixels to accumulate charges at the first ends of the photodiodes of all of the sensor pixels; and
   during a first transferring period after the first sensing period, turning off the first switches of all of the sensor pixels, turning off reset switches of all of the sensor pixels, and turning on the second switches of all of the sensor pixels to transfer the voltage levels of the first ends of the photodiodes to floating diffusion nodes of all of the sensor pixels.

6. The image device of claim 5, wherein the first timing scheme further comprises:
   during the first reset period, turning on the reset switches of all of the sensor pixels to reset voltage levels of the floating diffusion nodes of all of the sensor pixels.

7. The image device of claim 5, wherein the first timing scheme further comprises:
   during a second reset period after the first transferring period, turning on the reset switches of all of the sensor pixels to reset voltage levels of the floating diffusion nodes of all of the sensor pixels.

8. The image device of claim 5, wherein the each sensor pixel further comprises:

a readout circuit coupled to the second switch and the reset switch, and configured to output a readout signal based on the voltage level of the floating diffusion node of the each sensor pixel;

wherein the first timing scheme further comprises:

during a first readout period after the first transferring period, turning off first switches, second switches, and reset switches of sensor pixels arranged in a same pixel line of the pixel array, and enabling readout circuits of the sensor pixels arranged in the same pixel line to output first readout signals based on voltage levels of floating diffusion nodes of the sensor pixels arranged in the same pixel line;

during a third reset period after the first readout period, turning off the second switches of the sensor pixels arranged in the same pixel line and turning on the reset switches of the sensor pixels arranged in the same pixel line to reset the voltage levels of the floating diffusion nodes of the sensor pixels arranged in the same pixel line to reference levels; and during a second readout period after the third reset period, turning off the first switches, the second switches and the reset switches of the sensor pixels arranged in the same pixel line, and enabling the readout circuits of the sensor pixels arranged in the same pixel line to output second readout signals based on the reference levels.

9. The image device of claim 8, wherein the readout circuit comprises:

a transistor, comprising:

a first end coupled to the first power supply terminal;

a second end; and a control end coupled to the floating diffusion node; and a readout switch, configured to control electrical connection between the second end of the transistor and an output end of the readout circuit, wherein the readout signal is outputted via the output end.

10. An image device, comprising:

a pixel array, comprising a plurality of sensor pixels, wherein each sensor pixel comprises:

a photodiode configured to detect light;

a first switch coupled between a first power supply terminal and a first end of the photodiode, and configured to reset a voltage level of the first end of the photodiode;

a second switch coupled between the first end of the photodiode and a floating diffusion node, and configured to transfer the voltage level of the first end of the photodiode to the floating diffusion node; and a reset switch coupled between the first power supply terminal and the floating diffusion node, and configured to reset a voltage level of the floating diffusion node; and a controller coupled to the pixel array, and configured to switch the image device between a first mode and a second mode;

wherein when the image device is in the first mode, the controller manipulates the sensor pixels according to a first timing scheme, configuring the image device to function as a global shutter image sensor for capturing images of a scene; and wherein when the image device is in the second mode, the controller manipulates the sensor pixels according to a second timing scheme, configuring the image device to function as a dynamic vision sensor (DVS) for detecting changes in the scene; and wherein the second timing scheme comprises:

during a first reset period, turning off second switches and reset switches of sensor pixels arranged in a same pixel line of the pixel array, and turning on first switches of the sensor pixels arranged in the same pixel line to reset voltage levels of first ends of photodiodes of the sensor pixels arranged in the same pixel line;

during a first sensing period after the first reset period, turning off the first switches and the second switches of the sensor pixels arranged in the same pixel line to accumulate charges at the first ends of the photodiodes of the sensor pixels arranged in the same pixel line, turning off the reset switches of the sensor pixels arranged in the same pixel line, and outputting first readout signals based on voltage levels of floating diffusion nodes of the sensor pixels arranged in the same pixel line;

during a second reset period after the first sensing period, turning off the first switches and the second switches of the sensor pixels arranged in the same pixel line of the pixel array, and turning on the reset switches of the sensor pixels arranged in the same pixel line to reset the voltage levels of the first ends of the photodiodes of the sensor pixels arranged in the same pixel line;

during a first transferring period after the second reset period, turning off the first switches and the reset switches of the sensor pixels arranged in the same pixel line, and turning on the second switches of the sensor pixels arranged in the same pixel line to transfer the voltage levels of the first ends of the photodiodes of the sensor pixels arranged in the same pixel line to the floating diffusion nodes of the sensor pixels arranged in the same pixel line; and during a first readout period after the first transferring period, turning off the first switches, the second switches and the reset switches of the sensor pixels arranged in the same pixel line, and outputting second readout signals based on the voltage levels of the floating diffusion nodes of the sensor pixels arranged in the same pixel line.

11. The image device of claim 10, wherein the each sensor pixel further comprises:

a readout circuit, coupled to the second switch and the reset switch, and configured to output a readout signal based on the voltage level of the floating diffusion node of the each sensor pixel.

12. The image device of claim 11, wherein the readout circuit comprises:

a transistor, comprising:

a first end coupled to the first power supply terminal;

a second end; and a control end coupled to the floating diffusion node; and a readout switch, configured to control electrical connection between the second end of the transistor and an output end of the readout circuit, wherein the readout signal is outputted via the output end.

* * * * *